United States Patent
Wu (10) Patent No.: US 11,006,331 B2
(45) Date of Patent: May 11, 2021

(54) DEVICE AND METHOD OF HANDLING PRE-ALLOCATED UPLINK GRANT

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/928,117

(22) Filed: Mar. 22, 2018

(65) Prior Publication Data
US 2018/0279185 A1 Sep. 27, 2018

Related U.S. Application Data

(60) Provisional application No. 62/475,899, filed on Mar. 24, 2017.

(51) Int. Cl.
*H04W 36/00* (2009.01)
*H04W 36/38* (2009.01)
(Continued)

(52) U.S. Cl.
CPC ....... *H04W 36/0072* (2013.01); *H04W 36/38* (2013.01); *H04W 72/1284* (2013.01);
(Continued)

(58) Field of Classification Search
CPC ..... H04W 76/34; H04W 76/15; H04W 24/04; H04W 24/10; H04W 12/24; H04W 12/04; H04W 36/0072; H04W 36/38; H04W 76/18; H04W 36/18; H04W 72/1284; H04W 36/0055; H04W 72/0473;
(Continued)

(56) References Cited

U.S. PATENT DOCUMENTS 9,338,711 B2 *  5/2016  Wu .................. H04W 36/0005
9,554,397 B2 *  1/2017  Cai .................. H04W 72/1289
(Continued)

FOREIGN PATENT DOCUMENTS

CN       101616443 A     12/2009
WO       2016/171010 A1  10/2016

OTHER PUBLICATIONS

3GPP TS 36.321 V14.2.0 (Mar. 2017) Technical Specification 3rd Generation Partnership Project; Technical Specification Group Radio Access Network; Evolved Universal Terrestrial Radio Access (E-UTRA); Medium Access Control (MAC) protocol specification (Release 14).
(Continued)

*Primary Examiner* — Hanh N Nguyen
(74) *Attorney, Agent, or Firm* — Winston Hsu (57) ABSTRACT

A communication device for handling a pre-allocated uplink (UL) grant comprises a storage device and a processing circuit, coupled to the storage device. The storage device stores, and the processing circuit is configured to execute instructions of: using a first temporary identity to perform a data communication with a first base station (BS) via a first cell; receiving a handover command from the first BS, wherein the handover command configures the pre-allocated UL grant and configures the communication device to perform a handover to a second cell; and releasing the pre-allocated UL grant in response to a failure, when detecting the failure before completing the handover to the second cell.

12 Claims, 5 Drawing Sheets

(51) Int. Cl.
*H04W 76/18* (2018.01)
*H04W 76/34* (2018.01)
*H04W 72/12* (2009.01)
*H04W 76/11* (2018.01)
*H04W 36/14* (2009.01)
*H04W 36/18* (2009.01)

(52) U.S. Cl.
CPC ............ *H04W 76/11* (2018.02); *H04W 76/18* (2018.02); *H04W 76/34* (2018.02); *H04W 36/14* (2013.01); *H04W 36/18* (2013.01)

(58) Field of Classification Search
CPC ..... H04W 52/04; H04W 36/00; H04W 36/36; H04W 36/28; H04W 36/02; H04W 76/11; H04W 36/14; H04W 36/0079; H04W 36/0077; H04W 76/19; H04W 76/30; H04W 76/38; H04W 36/08; H04L 41/0668; H04L 41/0816
See application file for complete search history.

(56) References Cited

U.S. PATENT DOCUMENTS

| | | | |
|---|---|---|---|
| 9,888,424 B2* | 2/2018 | Basu Mallick ... | H04W 74/0833 |
| 9,930,581 B2* | 3/2018 | Bai ..................... | H04W 36/305 |
| 10,292,081 B2* | 5/2019 | Lee ..................... | H04W 36/18 |
| 2013/0258882 A1* | 10/2013 | Dinan ................. | H04W 52/242 |
| | | | 370/252 |
| 2015/0319774 A1 | 11/2015 | Cai | |
| 2015/0365854 A1 | 12/2015 | Bai | |
| 2016/0174124 A1 | 6/2016 | Basu Mallick | |
| 2016/0192269 A1* | 6/2016 | Kim .................... | H04W 36/30 |
| | | | 370/332 |
| 2018/0184475 A1* | 6/2018 | Babaei ................ | H04W 72/082 |

OTHER PUBLICATIONS

Search Report dated May 23, 2018 for EP application No. 18163802.4, pp. 1-7.
3GPP TS 36.331 V14.2.0 (Mar. 2017), "3rd Generation Partnership Project; Technical Specification Group Radio Access Network; Evolved Universal Terrestrial Radio Access (E-UTRA); Radio Resource Control (RRC); Protocol specification (Release 14)", XP051291443, pp. 1-721.
ZTE Corporation, "Introduction of mobility enhancement solutions in RRC", 3GPP TSG-RAN2 Meeting #96, R2-169178, Nov. 14-18, 2016, Reno, Nevada, USA, XP051203546, pp. 1-18.
ZTE Corporation, "Email discussion report on open issues of mobility enhancement", 3GPP TSG-RAN2 Meeting #96, R2-168942, Nov. 14-18, 2016, Reno, Nevada, USA, XP051193476, pp. 1-12.
ZTE Corporation, "Introduction of mobility enhancement solutions in RRC", 3GPP TSG-RAN2 Meeting #97, R2-1702394, Feb. 13-17, 2017, Athens, Greece, XP051232660, pp. 1-52.
Ericsson, "Release of UL grant at RACH-less procedures", 3GPP TSG-RAN WG2 #97, Tdoc R2-1701552, Feb. 13-17, 2017, Athens, Greece, XP051212173, pp. 1-16.
Office action dated Jan. 15, 2019 for the Taiwan application No. 107110278, filing date Mar. 26, 2018, pp. 1-16.
Office action dated Feb. 18, 2020 for EP application No. 18163802.4, pp. 1-7.
Office action dated Jun. 2, 2020 for the China application No. 201810254491.0, filed Mar. 26, 2018, p. 1-11.

* cited by examiner

DEVICE AND METHOD OF HANDLING PRE-ALLOCATED UPLINK GRANT

CROSS REFERENCE TO RELATED APPLICATIONS

This application claims the benefits of U.S. Provisional Applications No. 62/475,899 filed on Mar. 24, 2017, which is incorporated herein by reference.

BACKGROUND OF THE INVENTION

1. Field of the Invention

The present invention relates to a device and a method used in a wireless communication system, and more particularly, to a device and a method of handling a pre-allocated uplink grant.

2. Description of the Prior Art

3rd Generation Partnership Project (3GPP) continues improving a long-term evolution (LTE) system by introducing carrier aggregation (CA), Dual Connectivity (DC), LTE transmission over an unlicensed spectrum (LTE-unlicensed (LTE-U) or licensed-assisted access (LAA)). 3GPP recently starts developing a next generation cellular system called a new radio (NR) system or a next generation (NextGen) system. Accordingly, Inter-system mobility between the LTE system and the NR/NextGen system should be solved, to provide seamless service continuity for a user equipment (UE) moving between the two systems.

SUMMARY OF THE INVENTION

The present invention therefore provides a method and related communication device for handling a pre-allocated uplink grant to solve the abovementioned problem.

A communication device for handling a pre-allocated uplink (UL) grant comprises a storage device and a processing circuit, coupled to the storage device. The storage device stores, and the processing circuit is configured to execute instructions of: using a first temporary identity to perform a data communication with a first base station (BS) via a first cell; receiving a handover command from the first BS, wherein the handover command configures the pre-allocated UL grant and configures the communication device to perform a handover to a second cell; and releasing the pre-allocated UL grant in response to a failure, when detecting the failure before completing the handover to the second cell.

A communication device for handling a pre-allocated uplink (UL) grant comprises a storage device and a processing circuit, coupled to the storage device. The storage device stores, and the processing circuit is configured to execute instructions of: using a first temporary identity to perform a first data communication with a first base station (BS) via a first cell, when using a second temporary identity to perform a second data communication with a second BS via a second cell; receiving a radio resource control (RRC) message from the first BS or the second BS, wherein the RRC message configures the pre-allocated UL grant and configures the communication device to perform a secondary cell group (SCG) change from the second cell to a third cell; and releasing the pre-allocated UL grant in response to a SCG failure, when detecting the SCG failure before completing the SCG change to the third cell.

A communication device for handling a pre-allocated uplink (UL) grant comprises a storage device and a processing circuit, coupled to the storage device. The storage device stores, and the processing circuit is configured to execute instructions of: using a temporary identity to perform a data communication with a base station (BS) via a cell; receiving a radio resource control (RRC) message from the BS, wherein the RRC message configures the pre-allocated UL grant; and releasing the pre-allocated UL grant in response to a failure, when detecting the failure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
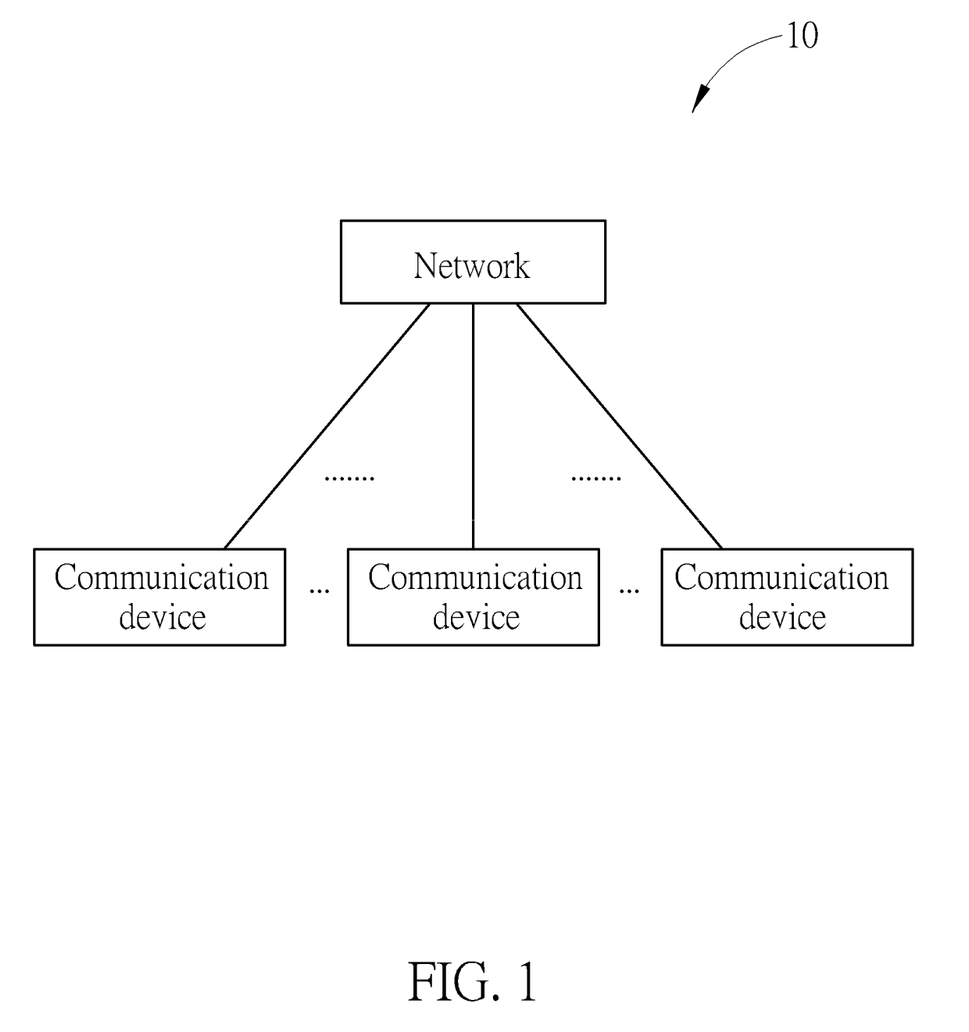
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., multiple carriers) belonging to one or multiple base stations (BSs). The abovementioned cells may be operated in the same or different duplexing modes, e.g., frequency-division duplexing (FDD), time-division duplexing (TDD) or flexible duplexing.

In FIG. 1, the network and the communication devices are simply utilized for illustrating the structure of the wireless communication system 10. Practically, the network includes at least one of a long-term evolution (LTE) network and a new radio (NR)/next generation (NextGen) network. The LTE network may include an evolved universal terrestrial radio access network (E-UTRAN) including at least one evolved NB (eNB) and an Evolved Packet Core (EPC). The at least one eNB connects to the EPC. The NR/NextGen network may include a 5G (or called NR) radio access network including at least one of a 5G BS (or called gNB) and a NextGen Core (NGC). The 5G BS connects to the NGC. An eLTE eNB is an evolution of an eNB that supports connectivity to the NGC. In this case, the eLTE eNB may be considered in the LTE network or the NR/NextGen network. The 5G radio communication technology may employ orthogonal frequency-division multiplexing (OFDM) and/or non-OFDM, and transmission time interval (TTI) shorter than 1 ms (e.g., 1, 2, 3 or 4 OFDM symbols, 100, or 200 us) for communicating between the communication devices and the 5G BS.

A communication device may be a user equipment (UE), a narrowband Internet of Things (NB-IoT) UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
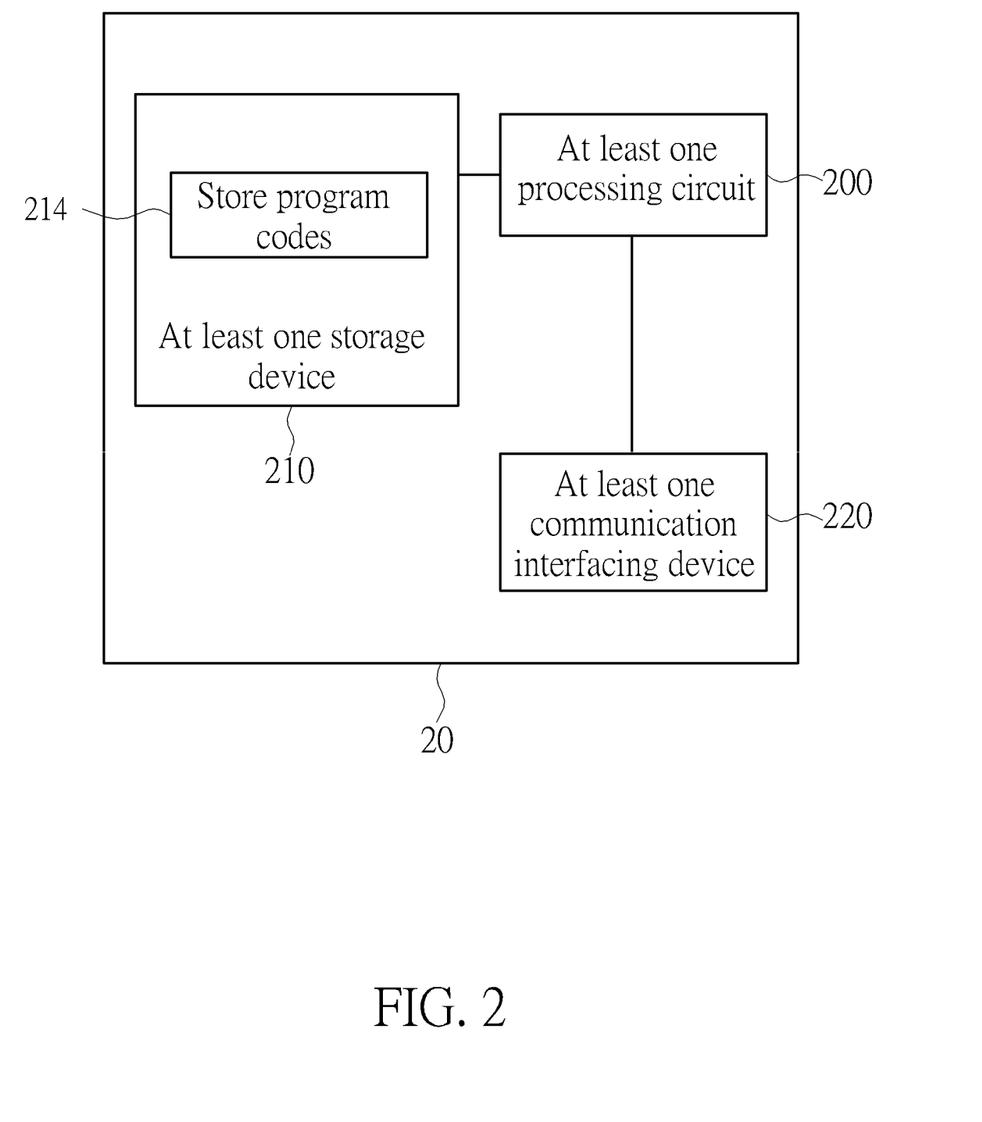
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
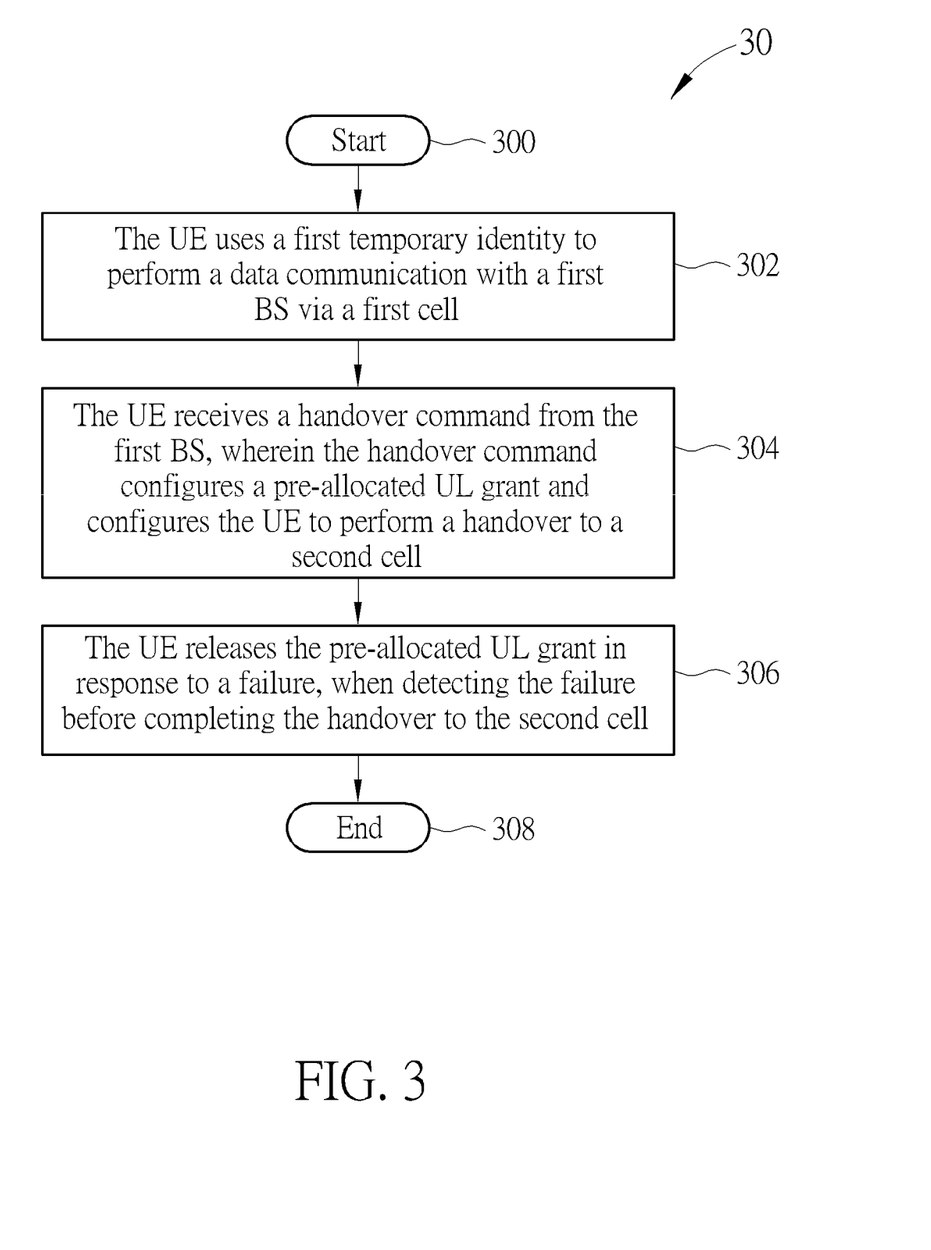
FIG. 3 is a flowchart of a process according to an example of the present invention.

A process 30 in FIG. 3 may be utilized in a UE, and includes the following steps:

Step 300: Start.

Step 302: The UE uses a first temporary identity to perform a data communication with a first BS via a first cell.

Step 304: The UE receives a handover command from the first BS, wherein the handover command configures a pre-allocated UL grant and configures the UE to perform a handover to a second cell.

Step 306: The UE releases the pre-allocated UL grant in response to a failure, when detecting the failure before completing the handover to the second cell.

Step 308: End.

In one example, the second cell belongs to the first BS or a second BS. The first cell and the second cell may be a same cell or different cells.

In one example, the failure is a radio link failure (RLF) or a handover failure. The UE may detect the failure due to an expiry of a timer (e.g., timer T304 or T310) running in the UE. The UE may detect the failure, when the maximum number of retransmissions has been reached for a radio bearer (RB). When the UE detects the failure, the UE may perform a radio resource control (RRC) connection re-establishment by transmitting a RRCConnectionReestablishmentRequest message to a BS (e.g., the first BS or another BS) via a cell (e.g., the first cell, the second cell or another cell). In one example, the UE releases the pre-allocated UL grant in response to the failure or the RRC connection re-establishment. In one example, the UE does not release the first temporary identity in response to the failure or the RRC connection re-establishment. The UE may release a second temporary identity in response to the failure or the RRC connection re-establishment. Any of the first temporary identity and the second temporary identity may be configured by the network. In one example, the first temporary identity is a Cell Radio Network Temporary Identifier (RNTI) (C-RNTI). In one example, the second temporary identity is a RNTI different from a C-RNTI. For example, the RNTI is a Semi-Persistent Scheduling C-RNTI, a Sounding Reference Symbols-Transmit Power Control-RNTI (SRS-TPC-RNTI), a Transmit Power Control-Physical Uplink Control Channel-RNTI (TPC-PUCCH-RNTI) or a Transmit Power Control-Physical Uplink Shared Channel-RNTI (TPC-PUSCH-RNTI).

In one example, the UE releases a secondary cell (SCell) configured by the first BS or another BS, in response to the failure or the RRC connection re-establishment.

In one example, the handover command is a RRC message (e.g., RRCConnectionReconfiguration message) including an information element (IE) for the handover. For example, the IE is a mobilityControlInfo IE.

In one example, the RRC message may include a RACH-Skip IE, a RACH-SkipSCG IE or a ul-ConfigInfo IE configuring the pre-allocated UL grant. In one example, the UE releases the pre-allocated UL grant by releasing the RACH-Skip IE or the ul-ConfigInfo IE.

In one example, the pre-allocated UL grant is for the UE to complete the handover without performing a random access procedure to the second cell.

In one example, if (or when) the UE does not detect the failure and the UE synchronizes to the second cell, the UE transmits a handover complete message on the second cell in response to the handover command by using the pre-allocated UL grant according to a 3GPP specification. In one example, the handover complete message is a RRC response message, e.g., RRCConnectionReconfigurationComplete.

The process 30 and the above examples prevent the UE from performing transmission (s) (according to the pre-allocated UL grant) which interferes transmissions of other UEs, after the failure or the RRC connection re-establishment (i.e., recovering the failure).

Figure 4:
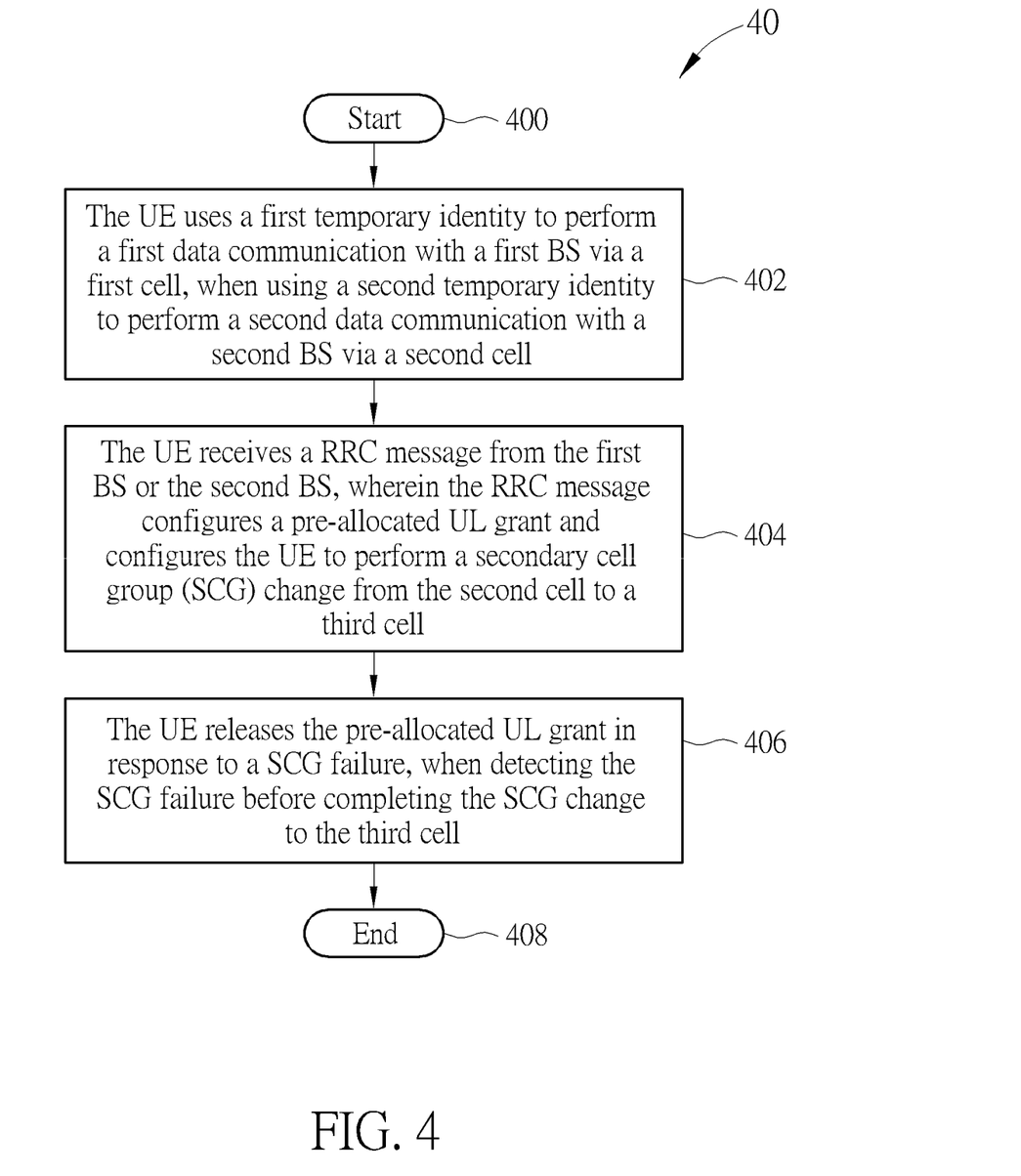
FIG. 4 is a flowchart of a process according to an example of the present invention.

A process 40 FIG. 4 may be utilized in a UE, and includes the following steps:

Step 400: Start.

Step 402: The UE uses a first temporary identity to perform a first data communication with a first BS via a first cell, when (e.g. while) using a second temporary identity to perform a second data communication with a second BS via a second cell.

Step 404: The UE receives a RRC message from the first BS or the second BS, wherein the RRC message configures a pre-allocated UL grant and configures the UE to perform a secondary cell group (SCG) change from the second cell to a third cell.

Step 406: The UE releases the pre-allocated UL grant in response to a SCG failure, when detecting the SCG failure before completing the SCG change to the third cell.

Step 408: End.

In one example, the SCG change is performed according to a 3GPP specification. The UE may detect the SCG failure due to an expiry of a timer (e.g., timer T307 or T313). The UE may detect the SCG failure, when the maximum number of retransmissions has been reached for an SCG or a RB.

In one example, the third cell belongs to the second BS or a third BS. The second cell and the third cell may be a same cell or different cells. In one example, the first BS is a master BS, and the second BS is a secondary BS.

In one example, the SCG failure is a RLF or a SCG change failure, or is caused by exceeding a maximum UL transmission timing difference between the first BS and the second BS. When the UE detects the SCG failure, the UE may transmit a SCGFailureInformation message to the first BS. In one example, the UE releases the pre-allocated UL grant in response to the SCG failure or the transmission of the SCGFailureInformation message. In one example, the UE does not release the first temporary identity in response to the SCG failure or the transmission of the SCGFailureInformation message. In one example, the UE does not release the second temporary identity in response to the SCG failure or the transmission of the SCGFailureInformation message. The UE may release a third temporary identity in response to the SCG failure or the transmission of the SCGFailureInformation message. Any of the first temporary identity, the second temporary identity and the third temporary identity may be configured by the network (e.g., by the first BS, the second BS and/or the third BS). In one example, the first temporary identity is a first C-RNTI. The second temporary identity may be a second C-RNTI. The third temporary identity may be a RNTI different from a C-RNTI. For example, the RNTI is a Semi-Persistent Scheduling C-RNTI, a SRS-TPC-RNTI, a TPC-PUCCH-RNTI, a TPC-PUSCH-RNTI.

In one example, the RRC message includes an IE for the SCG change. For example, the RRC message is a RRCConnectionReconfiguration message and the IE is a mobilityControlInfoSCG IE. The RRC message may include a RACH-Skip IE or a ul-ConfigInfo configuring the pre-allocated UL grant. In one example, the UE releases the pre-allocated UL grant by releasing the RACH-Skip IE or the ul-ConfigInfo IE.

In one example, the pre-allocated UL grant is for the UE to complete the SCG change without performing a random access procedure to the third cell. In one example, if (or when) the UE does not detect the SCG failure and the UE synchronizes to the third cell, the UE performs a Physical UL Shared Channel (PUSCH) transmission on the third cell by using the pre-allocated UL grant according to a 3GPP specification.

The process 40 and the above examples prevent the UE from performing transmission(s) according to the pre-allocated UL grant) which interferes transmissions of other UEs on the third cell, after the SCG failure.

Figure 5:
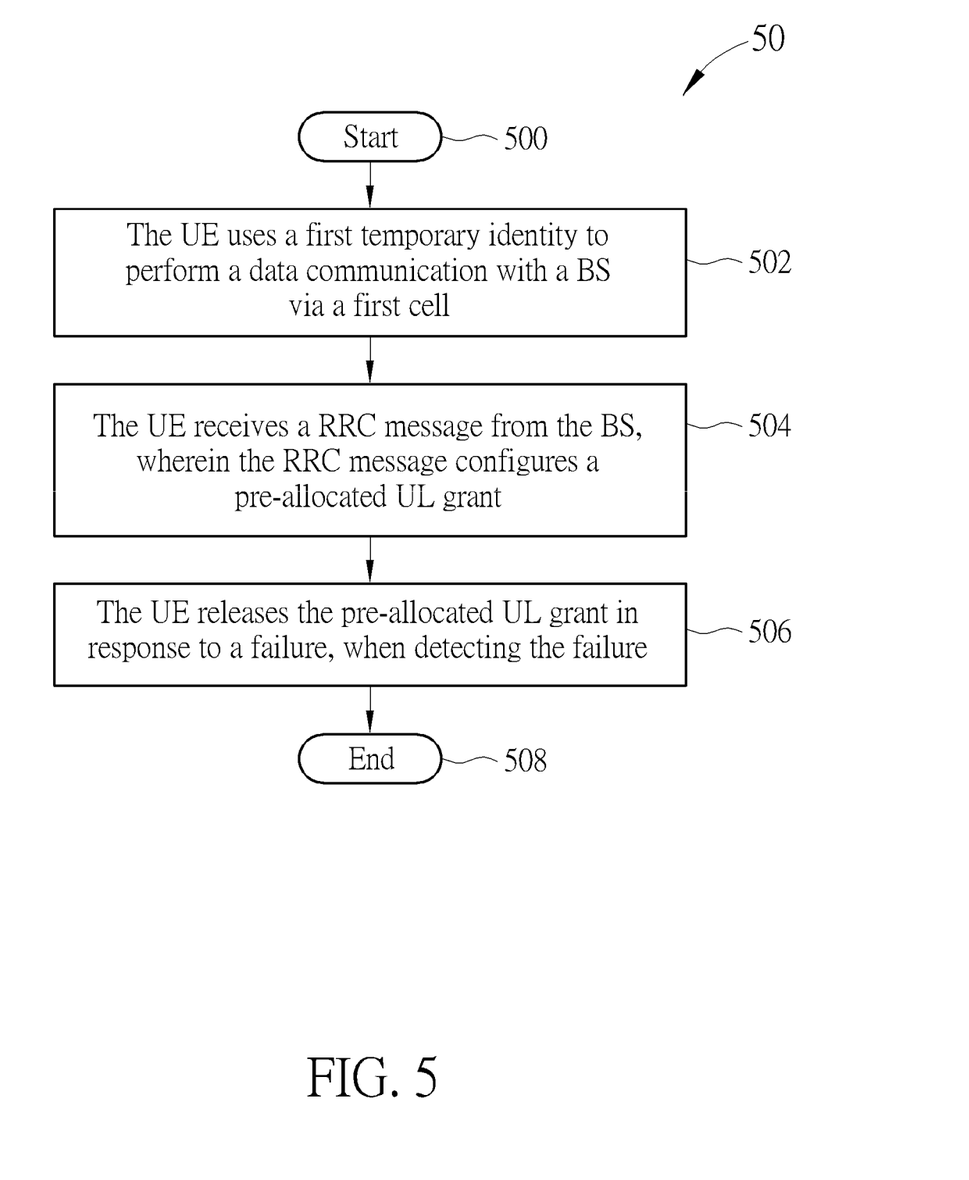
FIG. 5 is a flowchart of a process according to an example of the present invention.

A process 50 in FIG. 5 may be utilized in a UE, and includes the following steps:

Step 500: Start.

Step 502: The UE uses a first temporary identity to perform a data communication with a BS via a first cell.

Step 504: The UE receives a RRC message from the BS, wherein the RRC message configures a pre-allocated UL grant.

Step 506: The UE releases the pre-allocated UL grant in response to a failure, when detecting the failure.

Step 508: End.

The process 50 may be seen as an example according to the processes 30-40. The BS may be the first BS or the second BS in the processes 30-40, and the examples for the processes 30-40 may be applied to the process 50. The following examples may be applied to the process 50.

In one example, the BS may configure the pre-allocated UL grant specifically associated to a RB or a logical channel (LC) configured to the UE. The UE may perform a PUSCH transmission to the BS by using the pre-allocated UL grant before detecting the failure (i.e., when not detecting the failure). The PUSCH transmission may include data associated to the RB or the LC. In one example, the BS may configure the pre-allocated UL grant associated to any RB or any LC. Before detecting the failure, the UE may perform a PUSCH transmission to the BS by using the pre-allocated UL grant. The PUSCH transmission may include data irrespective of which RB or LC the data is associated to.

The processes 30-50 may be modified to be applied to a network (e.g., BS), e.g., by changing "UE" to "BS" and "receive" to "transmit" or vice versa. The BS may detect the failure, when receiving a first RRC message (e.g., SCGFailureInformation) informing the failure or a second RRC message (e.g., RRCConnectionReestablishmentRequest) initiating recovering the failure. The BS may transmit a third RRC message configuring a pre-allocated UL grant to the UE, after the failure. The failure may be a RLF, a handover failure or a SCG failure described previously.

Those skilled in the art should readily make combinations, modifications and/or alterations on the abovementioned description and examples. For example, the skilled person easily makes new embodiments of the network based on the embodiments and examples of the UE or the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for solving validity of a pre-allocated UL grant. Thus, interference caused by transmission(s) performed according to the pre-allocated UL grant can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a pre-allocated uplink (UL) grant, comprising:
   a storage device; and
   a processing circuit, coupled to the storage device, wherein the storage device stores, and the processing circuit is configured to execute instructions of:
   using a first temporary identity to perform a first data communication with a first base station (BS) via a first cell, when using a second temporary identity to perform a second data communication with a second BS via a second cell;
   receiving a radio resource control (RRC) message from the first BS or the second BS, wherein the RRC message includes an information element which configures the pre-allocated UL grant and configures the communication device to perform a secondary cell group (SCG) change from the second cell to a third cell;
   releasing the pre-allocated UL grant in response to a SCG failure, when detecting the SCG failure before completing the SCG change to the third cell; and
   performing a physical UL shared channel (PUSCH) transmission on the third cell by using the pre-allocated UL grant, when the communication device does not detect the SCG failure and synchronizes to the third cell.

2. The communication device of claim 1, wherein the third cell belongs to the second BS or a third BS, and the SCG failure is a radio link failure or a SCG change failure.

3. The communication device of claim 1, wherein the communication device detects the SCG failure according to an expiry of a timer running in the communication device, detects the SCG failure when the maximum number of retransmissions is reached for an SCG or a split radio bearer, or detects the SCG failure when a maximum UL transmission timing difference between the first BS and the second BS is exceeded.

4. The communication device of claim 1, wherein the instructions further comprise:
not releasing at least one of the first temporary identity and the second temporary identity in response to the SCG failure.

5. The communication device of claim 1, wherein the instructions further comprise:
releasing a third temporary identity in response to the SCG failure.

6. The communication device of claim 1, wherein the information element is a RACH-SkipSCG IE or an ul-ConfigInfo IE.

7. A method for a communication device to handle a pre-allocated uplink (UL) grant, comprising:
the communication device using a first temporary identity to perform a first data communication with a first base station (BS) via a first cell, when the communication device using a second temporary identity to perform a second data communication with a second BS via a second cell;
the communication device receiving a radio resource control (RRC) message from the first BS or the second BS, wherein the RRC message includes an information element which configures the pre-allocated UL grant and configures the communication device to perform a secondary cell group (SCG) change from the second cell to a third cell;
the communication device releasing the pre-allocated UL grant in response to a SCG failure, when detecting the SCG failure before completing the SCG change to the third cell; and
the communication device performing a physical UL shared channel (PUSCH) transmission on the third cell by using the pre-allocated UL grant, when the communication device does not detect the SCG failure and synchronizes to the third cell.

8. The method of claim 7, wherein the third cell belongs to the second BS or a third BS, and the SCG failure is a radio link failure or a SCG change failure.

9. The method of claim 7, wherein the communication device detects the SCG failure according to an expiry of a timer running in the communication device, detects the SCG failure when the maximum number of retransmissions is reached for an SCG or a split radio bearer, or detects the SCG failure when a maximum UL transmission timing difference between the first BS and the second BS is exceeded.

10. The method of claim 7, further comprising:
not releasing at least one of the first temporary identity and the second temporary identity in response to the SCG failure.

11. The method of claim 7, further comprising:
releasing a third temporary identity in response to the SCG failure.

12. The method of claim 7, wherein the information element is a RACH-SkipSCG IE or an ul-ConfigInfo IE.

* * * * *